Patented Feb. 8, 1927.

1,616,525

UNITED STATES PATENT OFFICE.

MACDONALD C. BOOZE, OF WORCESTER, MASSACHUSETTS, ASSIGNOR TO NORTON COMPANY, OF WORCESTER, MASSACHUSETTS, A CORPORATION OF MASSACHUSETTS.

ARTICLE OF SILLIMANITE-BONDED GRANULAR MATERIAL AND METHOD OF MAKING THE SAME.

No Drawing.   Application filed May 20, 1921. Serial No. 471,194.

This invention relates to the ceramic art and more particular to an article of bonded granular material and to a process for making the same.

It is a well known practice in the ceramic art to mold articles from a plastic mixture of granular refractory material, such as crystalline alumina, and clay bonding material, allow them to dry thoroughly and to then fire them at a sufficient temperature to mature or set the clay bond used, thus giving the articles suitable strength and developing the other properties common to such ware. It has been found that by such a process the clay or other aluminous silicates present are sometimes dissociated to some extent in the firing operation and form synthetic sillimanite in small amounts throughout the bond of the finished article. The formation of synthetic sillimanite sometimes occurs also in porcelain, glass pots, fire clay and other ceramic bodies which have been fired at high temperatures, by decomposition or local chemical action, when the conditions happen to be favorable.

When a ceramic body containing $Al_2O_3$ and $SiO_2$ is fired under the ordinary ceramic kiln conditions, employed in making vitrified ware, a slight formation of a fibrous compound of the aluminum and silicon oxides, known as synthetic sillimanite, has been observed, but the value of such material as a bond for super-refractory grains, such as crystalline alumina, and particularly a bond consisting substantially of the fibrous compound, has not heretofore been recognized. The formula for this compound has not been definitely determined, but it is supposed to be represented by $xAl_2O_3 \cdot ySiO_2$ in which the "$x$" and "$y$" are probably in the ratio of 3 to 2. The natural mineral sillimanite is supposed to have the ratio of 1 to 1, but for the want of a better term to define the product formed in the present case, it will be designated as "synthetic sillimanite". The procedures and compositions previously employed have not been such as would result in an effective or complete conversion of the materials used to synthetic sillimanite in such bonded articles. Moreover, the usual ceramic bonds in which partial conversion to synthetic sillimanite has taken place are rendered less resistant to high temperatures and to chemical action, because such conversion removes the alumina and silica, thus setting free the more active constituents.

The principal objects of my invention are to employ synthetic sillimanite as the main ingredient of a bond for granular super-refractory material, such as crystalline alumina, and to provide a composition and a method of manufacture which will result in the formation of synthetic sillimanite in situ and in intimate contact with the refractory grains, and particularly effect a substantially complete conversion of the initial bonding ingredients to synthetic sillimanite. Other objects will be readily apparent in the following disclosure.

I have discovered as the result of my experimentation that this can be brought about by employing a bond mixture consisting essentially of alumina and silica and so heat treating the mass that it will be substantially or completely converted. Any unconverted materials of the bond will form a flux, the amount depending upon the relative proportions of the $Al_2O_3$ and $SiO_2$ content of the bond as well as the purity of materials used and the heat treatment to which the article has been subjected. Such impurities may be controlled by analysis of the raw materials, and should ordinarily be kept as low as practicable in order to maintain the refractoriness and chemical resistance of the product. It will likewise serve the purpose of increasing the refractoriness and chemical resistance of the bond to partially fill the spaces between the refractory granules with previously formed synthetic sillimanite.

In accordance with my invention, I may bond super-refractory granular materials with alumina and silica bearing materials, such as a mixture of kaolin and alumina, so proportioned that during the heat treatment they will react to form synthetic sillimanite in considerable proportions and form a unitary structure which will be resistant to chemical action and high temperatures. While the formation of synthetic sillimanite may occur as low as 1000° C., I find that a heat treatment as high as Seger cone 16 is well adapted to give a substantially complete conversion. Also the proportion of this synthetic product in the total bond mass depends upon the relative amounts of the materials selected.

As an example of a satisfactory composition, I may bond crystalline alumina granules with a bond mixture of 7 parts by weight of alumina containing approximately 99% of aluminum oxide, preferably in the finely divided condition, and a solution of dextrine or other temporary binding material, to give a fluid consistency, with 15 parts by weight of kaolin. For this purpose a Florida kaolin having the following composition may be satisfactorily used:

|  | Per cent. |
|---|---|
| $Al_2O_3$ | 40 |
| $SiO_2$ | 45 |
| $H_2O$ | 14 |
| Impurities | 1 |

The bond thus obtained is intimately mixed with approximately 78 parts by weight of granular crystalline alumina of which 40 parts are size 14 mesh, 25 parts 46 mesh and 13 parts 90 mesh and finer. The whole is thoroughly mixed, water being added to obtain the desired plasticity or consistency for shaping or molding, and then tamped into a mold of the required shape. The articles thus fashioned are allowed to dry thoroughly and then set into a kiln or furnace and given a heat treatment equivalent to cone 16, in accordance with usual ceramic procedure. Upon being heated the dextrine is volatilized or burned out of the mixture and the alumina and silica of the clay react to form synthetic sillimanite. The excess of silica in the clay and the free alumina which is added also react to form synthetic sillimanite and the remainder of the clay and other impurities which may be present will be fused into a glassy condition. The ware thus produced consists essentially of crystalline alumina grains held together by the bonding material, a large portion of which has been converted to synthetic sillimanite, the remainder, if any fluxes are present, forming a vitrified or glassy matrix.

The granular refractory material may be used in a variety of sizes of grain, which is sometimes advantageous for the production of a dense, strong product, or the particles may be uniformly fine or uniformly coarse, as desired, and the interstitial spaces filled with the raw ceramic bonding material or with previously prepared synthetic sillimanite granules, or partly left as voids for the production of a more porous body. If alumina is employed, it may be in the natural form such as corundum, or artificially prepared by melting and crystallizing bauxite or other aluminiferous material, containing various amounts of impurities. The alumina of the bonding material may be in the form of fine crystalline alumina, amorphous alumina powder or of an aluminous silicate which will decompose upon being heated to the temperature employed in firing the article to be made. Such materials as bauxite, hydrated alumina or other relatively pure aluminous compounds are to be preferred, but those of less purity may be employed with satisfactory results. Silica is most conveniently added in the form of clay, but finely divided quartz, silicates, silicic acid or their equivalents may be used successfully. The proportions of alumina and silica in the bond may be determined by the conditions in which they are added and under which the product is to be made and fired, as well as the principal use to which it is to be put. It is, however, best that they be so proportioned that the free or available alumina and silica shall be present in approximately the correct molecular ratio in accordance with the chemical formula of the compound and that the residue of other substances, at the temperature of firing and in the completed product, be as low as practicable. If the $SiO_2$ is in excess of the molecular amount required, a glassy matrix will be formed in addition to the synthetic product, and this will be advantageous in certain cases.

By the term "super-refractory" I mean those materials which are substantially unaffected by the heat conditions to which a refractory article is exposed during its manufacture or subsequent normal use, and of which crystalline alumina is an example. It is also to be observed that the grains of super-refractory material are substantially in contact with one another in the finished article, thereby providing a body of low heat shrinkage, and that the bond is present in the interstices between the grains and is employed in a small amount only sufficient to bond the refractory grains into a body of the desired chemical and physical characteristics.

It will be apparent from the above disclosure that numerous other modifications, both with respect to the composition and condition of the materials used and the method of manufacture, may be made without going beyond the scope of my invention, and accordingly such changes are considered as being embodied in the above specification and in the appended claims.

Having thus described my invention, what I claim as new and desire to secure by Letters Patent is:

1. A ceramic article comprising super-refractory grains in graded sizes serving as the chief refractory ingredient thereof which are united into an integral mass by a relatively small amount of bond located in the interstices between the grains, the major portion of which is a synthetic sillimanite of the formula $x\ Al_2O_3 \cdot y\ SiO_2$.

2. A ceramic article comprising super-refractory grains forming the major portion thereof which are united into an integral mass by a bond located in the interstices between the grains, substantially all of said bond consisting of a compound of the formula $x\,Al_2O_3 \cdot y\,SiO_2$ formed in situ by heating alumina and silica bearing materials so proportioned as to produce said compound and a small amount of glassy matrix residue from said materials.

3. A ceramic body comprising crystalline alumina granules forming the major portion of the mass which are united into a porous structure by a bond consisting chiefly of alumina and silica converted by firing as high as Seger cone 16 into a fibrous refractory compound.

4. A ceramic body comprising crystalline alumina granules forming the major portion of the mass which are bonded by a ceramic bond insufficient in amount to fill the spaces between the granules, said bond having been formed in situ by firing materials bearing alumina and silica as high as Seger cone 16 to convert a large part thereof to a fibrous refractory compound of the formula $x\,Al_2O_3 \cdot y\,SiO_2$.

5. The process of manufacturing a ceramic article comprising the steps of mixing granular refractory material with a bond containing available silica and alumina in substantially molecular proportions to form a compound of the formula $x\,Al_2O_3 \cdot y\,SiO_2$, molding the mixture thus obtained to the desired shape and firing the shaped article at a high temperature to convert the major portion of the silica and alumina to a fibrous compound of such formula and bond the refractory granules therewith.

6. The process of manufacturing a ceramic article comprising mixing granular crystalline alumina with a bond mixture containing aluminous and silicious material proportioned to form synthetic sillimanite upon firing, moulding the mixture thus obtained to the desired shape, and subjecting the thus shaped article to a heat treatment such as to effect the conversion of substantially all the bond mixture to synthetic sillimanite, a portion of said bond mixture being initially in a form such as to hold the article in the desired shape during the firing operation until the ultimate desired bond formation takes place.

7. The process of manufacturing a ceramic article comprising the steps of mixing granular crystalline alumina and previously formed synthetic sillimanite in powdered form with a bond containing ingredients which will be converted to synthetic sillimanite at elevated temperatures, molding the mixture to the desired shape and firing such shaped article as high as Seger cone 16 to mature the bond and form a bond containing a large amount of synthetic sillimanite which unites the alumina granules.

Signed at Worcester, Massachusetts, this 19th day of May, 1921.

MACDONALD C. BOOZE.